United States Patent [19]

Bauer et al.

[11] Patent Number: 5,442,013
[45] Date of Patent: Aug. 15, 1995

[54] GRAFT COPOLYMER FOR TREATING SURFACE STRUCTURES

[75] Inventors: Harald Bauer, Rossdorf; Juergen Christner, Seeheim-Jugenheim; Maria L. Weber, Roedermark, all of Germany; Wolfgang Hoehne, Sao Leopoldo, Brazil

[73] Assignee: Röhm GmbH, Darmstadt, Germany

[21] Appl. No.: 232,836

[22] Filed: Apr. 25, 1994

[30] Foreign Application Priority Data

Apr. 27, 1993 [DE] Germany ............ 43 13 714.8

[51] Int. Cl.⁶ ............ C08F 265/06; C14C 11/00
[52] U.S. Cl. ............ 525/309; 427/389; 427/447; 8/94.21
[58] Field of Search ............ 525/309; 427/389, 447

[56] References Cited

U.S. PATENT DOCUMENTS

| | | | |
|---|---|---|---|
| 4,000,958 | 1/1977 | Hirooka et al. | 427/389 |
| 4,876,313 | 10/1989 | Lorah | 525/281 |
| 4,912,147 | 3/1990 | Phoeler et al. | 524/460 |
| 5,185,387 | 2/1993 | Klesse et al. | 523/201 |
| 5,226,645 | 11/1993 | Siol et al. | 525/309 |
| 5,228,809 | 2/1994 | Christner et al. | 525/309 |

FOREIGN PATENT DOCUMENTS

| | | |
|---|---|---|
| 0009258 | 4/1980 | European Pat. Off. . |
| 0082020 | 6/1983 | European Pat. Off. . |
| 0311908 | 4/1989 | European Pat. Off. . |
| 0387664 | 9/1990 | European Pat. Off. . |
| 0492405 | 7/1992 | European Pat. Off. . |
| 4211060 | 10/1993 | Germany . |

*Primary Examiner*—Vasu S. Jagannathan

[57] ABSTRACT

Aqueous emulsions of graft copolymers comprising acrylate esters of alkanols having 2–24 carbon atoms grafted onto a backbone polymer comprising monomers of acrylate esters of alkanols having 2–24 carbon atoms are disclosed, as is the finishing of surfaces such as tanned leather by applying such emulsions thereto.

1 Claim, No Drawings

GRAFT COPOLYMER FOR TREATING SURFACE STRUCTURES

The present invention relates to graft polymers comprising acrylates, to aqueous emulsions of such polymers for the treatment of flexible surface structures, particularly for the coating of leather, and to methods for finishing leather with aqueous emulsions of such graft polymers.

STATE OF THE ART

Tanned leather as a rule needs a finish, the nature of which is determined by the end use of the leather. In many cases among such finishing operations is treatment of the leather with chemical dressing auxiliaries which can strongly influence the appearance and the mechanical properties of the leather. Finishing operations using chemical auxiliary agents are, for example, the impregnation, grounding, and final finishing of leather (cf. F. Stather, *Gerbereichemie und Gerbereitechnologie*, Akademie-Verlag, Berlin 1967, pp 566–632; R. Schubert, Lederzurichtung-Oberflächenbehandlung des Leders, in H. J. Herfeld, Ed. *Bibliothek des Leders* Vol. 6, Umschauverlag 1982). Traditionally, polymer products among the polyurethanes, styrenebutadiene polymers, PVC-polyvinylacetate polymers, nitrocellulose and—with increasing tendency—the polyacrylates are used in finishing, usually in the form of dispersions. To be sure, the use of polyacrylates is limited in various respects, because the properties inherent in the polyacrylates do not correspond to the profile of those desired. Thus, for example, thermoplasticity is too high, which evidenced by poor stampability of the leather. Further, acrylate dispersions often have an insufficient cold flexibility in comparison with, for example, polyurethane dispersions. For many uses, such as in grounding, the often excessive stickiness of acrylate films disturbs. Finally, the mechanical properties of the acrylate dispersions, such as extension and tensile strength, are also not fully satisfactory when high demands are to be met. This results in an insufficient resistance of the leather to bending (in the Bally-Flexometer test). Similar deficiencies also exist in their resistance to water and solvents, which property is more strongly expressed by the polyurethane dispersions.

Problem and Solution

The deficiencies described above explain the desire of technology for improved polymer products having a cold flexibility down to −40° C., which have little or no stickiness, and which yet can readily be stamped.

German patent application P 42 11 060 published Oct. 7, 1993 describes polymer products for the treatment of leather comprising (meth)acrylic acid esters which are graft products of (meth)acrylic acid esters of $C_2$–$C_{24}$-alkanols onto a backbone polymer, which consists of 55–100 percent by weight of acrylic acid esters of $C_2$–$C_{24}$-alkanols, with the proviso that the alkyl groups in both monomer groups have van der Waals volumes which differ by less than 30 percent.

To be sure, the graft products according to this German patent application represent an advance in several respects, but they also do not fully satisfy from the viewpoint of cold flexibility. Thus, there still remains the task of producing acrylate dispersions which combine good mechanical properties with sufficient flexibility in the cold.

It has now been found that the disadvantages of the acrylate dispersions heretofore proposed for use in leather technology can be avoided by the graft polymers according to the present invention.

Thus, the invention relates to emulsion polymers comprising acrylates prepared by grafting one or more graft monomers of the formula

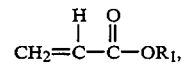

wherein $R_1$ stands for a hydrocarbon group, preferably an alkyl group having 2–24 carbon atoms, particularly 2–8 carbon atoms, on a backbone polymer which consists of 55–100 percent, particularly of 85–100 percent, and especially of 90–100 percent by weight, of monomers of the formula

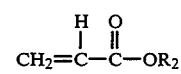

wherein $R_2$ stands for a hydrocarbon group having 2–24, particularly an alkyl group having 2–24, carbon atoms, preferably $2 \geq 8$ carbon atoms, with the proviso that the ratio of graft monomers of the formula I to monomers of the backbone polymer is from 1:9 to 1:1 in parts by weight.

Preferably the monomers are chosen from those wherein $R_1$ and $R_2$ stand for ethyl, n-butyl, isobutyl and 2-ethylhexyl.

In addition to the monomers of the formulas given above, the backbone polymer may comprise from 0 to 10, preferably 0.5 to 5, percent by weight of still further comonomers, copolymerizable with the earlier mentioned comonomers, having the formula

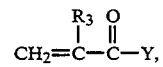

wherein $R_3$ means hydrogen or methyl and Y is —OH or —$OR_4$, where $R_4$ stands for

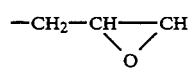

or for an alkyl group having 2–6 carbon atoms which is substituted by at least one hydroxyl group or by an —$NR_5R_6$ group, and $R_5$ and $R_6$ stand for hydrogen or alkyl having 1 to 6 carbon atoms, or wherein $R_5$ and $R_6$, together with the nitrogen atom and, optionally, a further nitrogen, oxygen, or sulfur hetero atom form a 5- or 6-membered heterocycle, or for a group —$NR_7R_8$ wherein $R_7$ stands for hydrogen or an alkyl group having 1 to 8 carbon atoms and $R_8$ signifies hydrogen or an alkyl group having 1 to 8 carbon atoms which may be substituted with an —$OR_9$ group, wherein $R_9$ stands for hydrogen or an alkyl group having 1 to 4 carbon atoms or for a group —$NR_5,R_6$, wherein $R_5$, and $R_6$, having the same meaning as $R_5$ and $R_6$.

In addition to comprising monomers having one or both of the formulas given above, the backbone polymer can contain still further comonomers (such that the total sum of monomers is 100 percent by weight) in such amounts that the character of the polymer as a polyacrylate, for example the $T_g$ and hardness, are not decisively altered. In such cases, the amount of further comonomers is at most 45 percent, preferably 20 percent or 15 percent or less, and especially from 0.1 to 10 percent by weight. As such monomers may be mentioned, for example, the vinyl esters of fatty acids, such as vinyl acetate and vinyl propionate, styrene and the methyl styrenes, esters of methacrylic acid, preferably with $C_1$–$C_6$-alcohols, and the like. The amount of similar "hard" monomers (having a hardness measured by $T_g$ equal to or greater than 60° C.) is preferably in the range from 0 to 10 percent by weight, and is at most 15 percent by weight (cf. *Ullmann's Encyclopadie der technischen Chemie*, 3rd edition, Vol. 14, pp 108–109, Urban & Schwarzenberg 1967). For example, synthesis of the backbone polymer from the monomers ethyl acrylate/-butyl acrylate, mostly in the region of about 65±5 percent by weight (based on total polymer), together with methacrylic acid and, optionally, methacrylamide and N-methacrylamide, has proved valuable. The amount of functional comonomers of the formula III, e.g. N-methylol methacrylamide, (meth)acrylamide, (meth)acrylic acid, glycidyl (meth)acrylate (cf. H. Rauch-Puntigam, Th. Völker, *Acryl- und Methacrylverbindungen*, Springer-Verlag 1968) should be smaller than 5 percent by weight based on the totality of the monomers.

In the synthesis of both the graft polymer as well as the backbone polymer, polyfunctional (meth)acrylic acid esters such as the esters of the polyvalent alcohols butane diol, glycol, triethylene glycol, hexane diol, as well as plurally unsaturated esters such as allyl(meth)acrylate can be present in amounts of 0–5 percent by weight, preferably 0.1 to 1 percent by weight.

Preparation of the Polymers

Preparation of the graft polymers according to the emulsion polymerization method (cf. Rauch-Puntigam, Th. Völker, *Acryl- und Methacrylverbindungen*, loc.cit., pp 217–230) is important in connection with the present invention. The polymers according to the invention are prepared in a two-stage emulsion polymerization method, wherein in the first step the backbone polymer is prepared, advantageously as a batch polymerization. Suitably, grafting follows directly thereafter, preferably by gradual addition of the graft monomers. A detailed procedure can be as follows:

First, an aqueous emulsion of the monomers preferably having a monomer content in the range of 10 to 40 percent by weight is put into a suitable reactor provided with a heater, stirrer, thermometer, facilities for the introduction of gas, etc., with the addition of emulsifiers known in the art, such as anionogens like the paraffin sulfonates and with addition of initiators suitable for emulsion polymerization, particular of redox initiators which contain a peroxidic component and a reducing component, for example a sulfur compound (usually in amounts from 0.01 to 0.2 percent by weight, based on the monomers). One suitably proceeds by first adding only the peroxidic partner of the redox initiator system. Mentioned as the peroxidic component and as the reducing component are, for example, peroxydisulfate and $Na_2S_2O_5$. Then the batch is warmed, suitably under a protective inert gas such as nitrogen/argon to a suitable polymerization temperature, about 35±10° C., and with addition of the reducing partner of the redox system. The temperature usually rises considerably within a short time, e.g. over about 10 minutes, to about 95° C.

Thereafter, the graft monomers are added, preferably dropwise, as a rule over a period of 10 to 90 minutes. Subsequently the batch is finally polymerized by warming, 80° C. being mentioned as a guide, for example. The dispersions obtained according to the invention usually have a solids content of 20 to 70 percent by weight, preferably 30 to 50 percent by weight, based on the total dispersion.

By variation of the monomers in the backbone polymer and graft polymer, as well as in the ratios of backbone to graft polymer, the glass transition temperature, $T_g$, and therewith also the cold flexibility (cold crack) of the total system, can be adjusted. See Kirk-Othmer, *Encyclopedia of Chemical Technology* 3rd edition, Vol. 1, pp 287–289, J. Wiley 1978; Viewig-Esser, *Kunststoff-Handbuch*, Vol. IX, pp 333–340, Carl Hanser Verlag 1975; H. F. Mark et al., *Encyclopedia of Polymer Science & Engineering* 2d edition, Vol. 7, pp 533–544, J. Wiley 1987 concerning the glass transition temperature, $T_g$, and the influence of the monomers on this property.

Advantageous Effects

The emulsion polymers according to the invention are well suited for the treatment, particularly the coating, of flexible surface structures such as leather, textiles, papers, inter alia.

A better understanding of the present invention and of its many advantages will be had by referring to the following specific examples, given by way of illustration. Examples 1–3 pertain to the preparation of polymer emulsions according to the invention. These can be made into various leather finishing auxiliaries by compounding using the recipes of Table 1. Finally, the finishing auxiliaries are used for leather finishing as described in Examples A-1 to A-3. The results of such finishing operations are reported in Table 2.

EXAMPLES

Example 1

Graft Polymer Comprising a Backbone Polymer of Ethyl Acrylate/Methacrylic Acid/Methacrylamide/N-Methylol Methacrylamide Grafted with Ethyl Acrylate in a Weight Ratio (65.5:2:1.5:1):30.

An emulsion of 229.25 g of ethyl acrylate, 7 g of methacrylic acid, 5.25 g of methacrylamide, 5.83 g of N-methylol methacrylamide, 2.63 g of the sodium salt of $C_{15}$-paraffin sulfonate as an emulsifier, 0.53 g of ammonium peroxydisulfate, 1.4 mg $FeSO_4$, and 520 g of water is warmed to 30° C. and combined with 0.26 g of $Na_2S_2O_5$ under inert gas (nitrogen or argon). The temperature rises within 8–10 minutes to 95° C. Immediately thereafter, 105 g of ethyl acrylate are added dropwise over 15 minutes. For final polymerization, the batch is stirred for 60 minutes at 90° C., then cooled. A stable dispersion is obtained with can be dried directly or after the addition of $NH_3$ to form an elastic film.

Example 2

Graft Polymer Comprising a Backbone Polymer of Ethyl Acrylate, Methacrylic Acid Grafted with Ethyl Acrylate in a Weight Ratio (68:2):30

As in Example 1, an emulsion of 238 g of ethyl acrylate, 7 g of methacrylic acid, 2.63 g of the sodium salt of paraffin sulfonate with 0.53 g of ammonium peroxydisulfate and 1.4 mg $FeSO_4$ as well as 0.26 g of $Na_2S_2O_5$ is prepared in 525 g of water and the monomers polymerized. 105 g of ethyl acrylate are grafted thereon.

Example 3

Graft Copolymer Comprising a Backbone Polymer of Ethyl Acrylate/Butyl Acrylate/Methacrylic Acid/Methacrylamide/N-Methylol Methacrylamide Grafted with Ethyl Acrylate in a Weight Ratio (55.5:10:2:1:1.5):30

As in Example 1, an emulsion of 194.25 g of ethyl acrylate, 35 g of butyl acrylate, 7 g methacrylic acid, 5.25 g of methacrylamide, 5.83 g of N-methylol methacrylamide, 2.63 g of the sodium salt of paraffin sulfonate, 0.53 g of ammonium peroxydisulfate, and 1.4 mg $FeSO_4$ as well as 0.26 g of $Na_2S_2O_5$ is prepared in 525 g of water and the monomers polymerized. 105 g of ethyl acrylate are grafted thereon.

Table 1 below gives formulations for finishing auxiliaries used for utility testing of the graft polymer of Example 1.

Following Examples A-1 to A-3 explain the use of the graft polymer of Example 1 in the formulations of Table 1.

A-1: Grounding for Full Grain Nappa Leather

The formulation A-1 is applied by spraying on once or twice with a commercial air pressurized spray pistol (about 4 bar pressure, nozzle breadth 1.2 to 1.4 mm) to achieve saturation (20–40 g/m²). Then the sample is dried either at 60° C.–80° C. in a drying tunnel with circulating air for 1–5 minutes or is dried at room temperature. The sample is next ironed at 80° C.–90° C. at a pressure of 50–100 bar. Then the sample is sprayed again twice with moderate levels (about 10–20 g/m²) of the same formulation and dried as above.

The total amount of finish applied is 60–100 g/m² to 80–120 g/m². Test results on this finish are reported in Table 2.

A-2 : Grounding for Wheeled Furniture Leather

The formulation A-2 is applied by spraying on, "airless" if opportunity presents, twice to give good coverage (75–125 g/m²). Drying follows as in A-1. Then an intermediate finish (nitrocellulose emulsion) is sprayed on, the sample is dried (see A-1), and then stamped at a temperature of 90° C. and a pressure of 250 bar for a duration of 3 seconds. A stamping plate having an artificial grain pattern with moderate pores is used. The sample is sprayed again at moderate strength (25–50 g/m²), dried, and then milled for 8 hours.

The total amount applied is between 200–300 g/m². Test results on the finish are given in Table 2.

A-3 : Grounding for Splits

The formulation A-3 is applied once by roller coating (100–175 g/m²) in a direction counter to the movement of the sample to which it is applied. The sample is then ironed at 90° C. and 150 bar for 3 seconds, followed by roller coating twice, with 75–100 g/m² and then with 25–75 g/m². Then an intermediate finish of a nitrocellulose emulsion is applied. The sample is then stamped at 90° C. at 250–300 bar for 3–5 seconds.

The total amount of finish applied is 200–300 g/m². The results of testing are evident from Table 2.

TABLE 1

| | Formulations of Graft Polymers for Specific Uses (Examples A-1 to A-3) | | |
|---|---|---|---|
| Test | A-1 | A-2 | A-3 |
| Leather Type | Grounding for full grain nappa leather | Grounding for wheeled furniture leather | Grounding for splits |
| Pigment Paste (35%) black | 100 parts by weight | 120 parts by weight | 120 parts by weight |
| Aqueous Casein-Fat Emulsion (20%) | — | 40 parts by weight | 80 parts by weight |
| Aqueous Paraffin Emulsion (22%) | 40 parts by weight | 40 parts by weight | 20 parts by weight |
| Aqueous Matting Paste Comprising Silicic Acid | 0–30 parts by weight | 0–50 parts by weight | 0–50 parts by weight |
| Water | 0–30 parts by weight | 0–30 parts by weight | 0–30 parts by weight |
| Acrylate Dispersion of Example 1 | 200 parts by weight | 450 parts by weight | 600 parts by weight |
| Aqueous Thickener (Acrylic Copolymer) viscosity 16–22 (measured in a Ford beaker with 4 mm nozzle), depending on absorption behavior of the leather | 0–30 parts by weight | 0–30 parts by weight | 0–30 parts by weight |
| Aqueous Silicon Emulsion (30%) | 0–20 parts by weight | 0–20 parts by weight | 0–20 parts by weight |
| Total Amount (g/m²) Applied in 2–4 Steps | 60–110 parts by weight | 200–300 parts by weight | 200–350 parts by weight |

TABLE 2

| | Results of Technical Utility Testing | | |
|---|---|---|---|
| | Flexometer* dry (Number of bends) | Flexometer* wet (Number of bends) | Abrasion Test (VESLIC wet) (Number of Abrasions) |
| A-1 Full grain Nappa leather (0.8–0.9 mm thick) without final finish** | >100,000 | >100,000 | 18–20 |
| A-2 Wheeled furniture leather (1–1.1 mm thick) without final finish** | >100,000 | 70,000 to 100,000 | 20–30 |
| A-3 Split (1.8–2 mm thick) | 80–100,000 | 40,000 to 60,000 | 20–30 |

What is claimed is:

1. An aqueous emulsion of an acrylate graft copolymer consisting of at least one graft monomer of the formula $$CH_2=CH-COOR_1$$

wherein $R_1$ is an alkyl group having 2-24 carbon atoms, graft polymerized onto a backbone polymer free of any crosslinking agent and comprising 55-100 percent by weight of at least one monomer of the formula $$CH_2=CH-COOR_2$$

wherein $R_2$ is alkyl having 2-24 carbon atoms, the ratio of graft monomers to monomers of the backbone polymer being from 1:9 to 1:1 in parts by weight.

* * * * *